US008509266B2

(12) United States Patent
Borkovsky et al.

(10) Patent No.: US 8,509,266 B2
(45) Date of Patent: Aug. 13, 2013

(54) USING NETWORK TRAFFIC LOGS FOR SEARCH ENGINE INDEX UPDATES

(75) Inventors: Arkady Borkovsky, San Francisco, CA (US); Douglas M. Cook, San Francisco, CA (US); Jean-Marc Langlois, Alameda, CA (US); Tomi Poutanen, Toronto (CA); Hongyuan Zha, State College, PA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/492,508

(22) Filed: Jun. 8, 2012

(65) Prior Publication Data

US 2012/0254144 A1    Oct. 4, 2012

Related U.S. Application Data

(60) Continuation of application No. 12/168,797, filed on Jul. 7, 2008, now Pat. No. 8,203,952, which is a division of application No. 10/124,509, filed on Apr. 16, 2002, now Pat. No. 7,398,271.

(60) Provisional application No. 60/284,353, filed on Apr. 16, 2001.

(51) Int. Cl.
*H04J 3/00* (2006.01)

(52) U.S. Cl.
USPC ........................................... 370/498

(58) Field of Classification Search
USPC ......... 370/203, 204–215, 229–240, 310–337, 370/338–350, 351–394, 395.1, 395.3, 395.4, 370/395.41, 395.42, 395.5, 395.52, 395.53, 370/412–421, 431–457, 458–463, 464–497, 370/498–529
See application file for complete search history.

(56) References Cited

U.S. PATENT DOCUMENTS

| | | | | |
|---|---|---|---|---|
| 5,933,832 A | * | 8/1999 | Suzuoka et al. | 707/101 |
| 6,018,619 A | * | 1/2000 | Allard et al. | 709/224 |
| 6,199,081 B1 | * | 3/2001 | Meyerzon et al. | 715/210 |
| 6,490,575 B1 | * | 12/2002 | Berstis | 1/1 |
| 6,546,388 B1 | * | 4/2003 | Edlund et al. | 707/5 |
| 6,591,266 B1 | * | 7/2003 | Li et al. | 707/10 |
| 6,751,612 B1 | * | 6/2004 | Schuetze et al. | 707/4 |
| 7,003,565 B2 | * | 2/2006 | Hind et al. | 709/224 |
| 7,383,299 B1 | * | 6/2008 | Hailpern et al. | 709/203 |
| 7,490,092 B2 | * | 2/2009 | Sibley et al. | 707/100 |
| 8,051,105 B1 | | 11/2011 | Johnson | |
| 2002/0032772 A1 | * | 3/2002 | Olstad et al. | 709/224 |

(Continued)

OTHER PUBLICATIONS

Xue, G. et al., "Implicit Link Analysis for Small Web Search", Proceedings of the 26th annual international ACM SIGIR conference on Research and development in information retrieval (2003) (8 pages).

*Primary Examiner* — Jung-Jen Liu
(74) *Attorney, Agent, or Firm* — Hickman Palermo Truong Becker Bingham Wong LLP

(57) ABSTRACT

A method and apparatus for using network traffic logs for search enhancement is disclosed. According to one embodiment, network usage is tracked by generating log files. These log files among other things indicate the frequency web pages are referenced and modified. These log files or information from these log files can then be used to improve document ranking, improve web crawling, determine tiers in a multi-tiered index, determine where to insert a document in a multi-tiered index, determine link weights, and update a search engine index.

14 Claims, 2 Drawing Sheets

(56) References Cited

U.S. PATENT DOCUMENTS

| | | | |
|---|---|---|---|
| 2002/0046389 A1* | 4/2002 | Hirakimoto et al. | 716/8 |
| 2002/0143933 A1* | 10/2002 | Hind et al. | 709/224 |
| 2003/0002436 A1* | 1/2003 | Anderson et al. | 370/218 |
| 2003/0105744 A1* | 6/2003 | McKeeth | 707/3 |
| 2005/0033745 A1* | 2/2005 | Wiener et al. | 707/10 |
| 2005/0216443 A1* | 9/2005 | Morton et al. | 707/3 |
| 2008/0313247 A1 | 12/2008 | Galvin | |

* cited by examiner

USING NETWORK TRAFFIC LOGS FOR SEARCH ENGINE INDEX UPDATES

CROSS-REFERENCE TO RELATED APPLICATIONS; BENEFIT CLAIM

This application claims benefit as a Continuation of application Ser. No. 12/168,797 filed Jul. 7, 2008, now U.S. Pat. No. 8,203,952 which claims benefit as a Divisional of application Ser. No. 10/124,509 (issued as U.S. Pat. No. 7,398,271 B1), filed Apr. 16, 2002, which claims benefit to provisional Appln. Ser. No. 60/284,353, filed Apr. 16, 2001. The entire contents of the above referenced applications are hereby incorporated by reference as if fully set forth herein, under 35 U.S.C. §120. This application is related to application Ser. No. 12/168,813 (issued as U.S. Pat. No. 7,996,397 B2) entitled USING NETWORK TRAFFIC LOGS FOR SEARCH ENHANCEMENT, filed Jul. 7, 2008. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to searching for documents, and more specifically, to using network traffic logs for search enhancement.

BACKGROUND OF THE INVENTION

The Internet, often simply called "the Net," is a worldwide system of computer networks and, in a larger sense, the people using it. The Internet is a public, self-sustaining facility that is accessible to tens of millions of people worldwide. The most widely used part of the Internet is the World Wide Web, often abbreviated "WWW" or simply referred to as just "the Web". The Web is an Internet service that organizes information through the use of hypermedia. The HyperText Markup Language ("HTML") is used to specify the contents and format of a hypermedia item (e.g., a Web page).

In this context, an HTML file is a file that contains the source code for a particular Web page. A Web page is the image that is displayed to a user when a particular HTML file is rendered by a browser application program. Unless specifically stated, an electronic or Web item may refer to either the source code for a particular Web page or the Web page itself.

Each page can contain imbedded references to images, audio, or other Web items. A user, using a Web browser, browses for information by following references, known as hyperlinks, that are embedded in each of the items. The HyperText Transfer Protocol ("HTTP") is the protocol used to access a Web item.

Through the use of the Web, individuals have access to millions of pages of information. However a significant drawback with using the Web is that because there is so little organization to the Web, at times it can be extremely difficult for users to locate the particular pages that contain the information that is of interest to them.

To address this problem, a mechanism known as a "search engine" has been developed to index a large number of Web pages and to provide an interface that can be used to search the indexed information by entering certain words or phases to be queried. Indexes are conceptually similar to the normal indexes that are typically found at the end of a book, in that both kinds of indexes comprise an ordered list of information accompanied with the location of the information. Values in one or more columns of a table are stored in an index, which is maintained separately from the actual database table. An "index word set" of an item is the set of words that are mapped to the item in an index. For items that are not indexed, the index word set is empty.

Although there are many popular Internet search engines, they are generally constructed using the same three common parts. First, each search engine has at least one "spider" that "crawls" across the Internet to locate Web items around the world. Upon locating an item, the spider stores the item's Uniform Resource Locator (URL), and follows any hyperlinks associated with the item to locate other Web items. Second, each search engine contains an indexing mechanism that indexes certain information about the items that were located by the spider. In general, index information is generated based on the contents of the HTML file. The indexing mechanism stores the index information in large databases that can typically hold an enormous amount of information. Third, each search engine provides a search tool that allows users to search the databases in order to locate specific items that contain information that is of interest to them.

The search engine provides an interface that allows users to specify their search criteria and, after performing a search, an interface for displaying the search results. Typically, the search engine orders the search results prior to presenting the search results interface to the user. The order usually takes the form of a "relevance ranking", where the matching item with the highest relevance ranking is the item considered most likely to satisfy the interest reflected in the search criteria specified by the user.

The specific techniques for determining that ranking vary from implementation to implementation. One factor used by many ranking mechanisms to determine relevance is the "popularity" of a web page. When all other factors are equal, pages that are "popular" are given higher rankings than pages that are visited less frequently.

Ranking mechanisms typically determine the popularity of web pages based on information collected by the search engine. For example, one type of information that can be collected by the search engine is how users use the search engine. Thus, if users of the search engine frequently select a particular link from the search results, then the popularity weight of the corresponding page may go up, therefore giving the page a higher relevance ranking.

Similarly, the spider of a search engine may be used to count the number of links that other pages contain to a particular page. The greater the number of links that point to a page, the more popular the page tends to be, so the pages with more incoming links are considered to have higher relevance than pages with fewer incoming links.

Since the perceived value of a search engine is highly dependent on the accuracy of its relevance rankings, it is clearly desirable to provide techniques for increasing the accuracy of the relevance ranking.

Based on the foregoing, it is desirable to provide improved techniques for improving search relevancy.

SUMMARY OF THE INVENTION

Techniques are provided for using network traffic logs for search enhancement. According to various aspects of the invention, data extracted from network usage logs is used in a variety of ways, including:

1) the ranking of a URL in the search results are improved by using the number of times a URL is present in the network traffic logs as an indication of popularity;

2) the list of URLs saved in the search engine index can be improved by including some or all URLs that are present in the network traffic logs;

3) the breakup of a search index into tiers can be improved by taking into account the number of times a URL is present in the network traffic logs;

4) the number of times a URL is present in the network traffic logs can be used to assign weights to links, where the link weights are used to determine popularity and the indexing of pages; and 5) the traffic log information may be used to determine which web pages have been modified since the search engine index was last updated.

These techniques may be used to improve the relevance ranking, indexing and searching of Internet-wide search engines, as well as search engines that are restricted to specific domains or private intranets.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION OF THE INVENTION

A method and apparatus for using network traffic logs for search enhancement is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

Functional Overview

One deficiency of conventional relevance ranking techniques is the limited scope of information through which they make relevance determinations. In particular, it is possible for a particular web page to be extremely popular and yet still be given a low popularity weight from a search engine. For example, assume that a company creates a web page to which few outside web pages point. Assume that word gets out that the web site is interesting, and people start sending email to all of their acquaintances directing them to visit the site. As a consequence, the site may become very popular.

However, conventional web engines lack the information to alert them to the popularity of such a site. In particular, the spider for the web engine may detect that the site has few incoming links, and the number of hits through the search engine may be small (because everyone is finding the site through email, not through use of the search engine). Based on the limited information that the search engine has at its disposal, the search engine may continue to assign a low popularity weight to the web site.

Techniques are provided for using network traffic logs for search enhancement. Various network devices maintain logs relating to the network communications in which they are involved. For example, a web server may generate a log of page requests that it receives. The log maintained by the web server may include, for example, the URL of the requested items, the time of the requests, and the address of the requestors.

Other network components, such as traffic servers, serve as a pipe through which information is requested and supplied. Such traffic servers may also maintain usage logs similar to the web server logs.

System Overview

According to one embodiment of the invention, popularity determination techniques are provided that take into account network usage information that is collected outside of the search engine environment. Such network usage information may come from any source that reliably indicates the actual usage of the network, including web browser plug-ins, web server logs, traffic server logs, and logs maintained by any other entity that monitors or participates in the supply of information over a network. Any party that controls such devices, such as Internet Service Providers, web site managers, etc., may collect the logs and provide them to the search engine provider.

Figure 1:
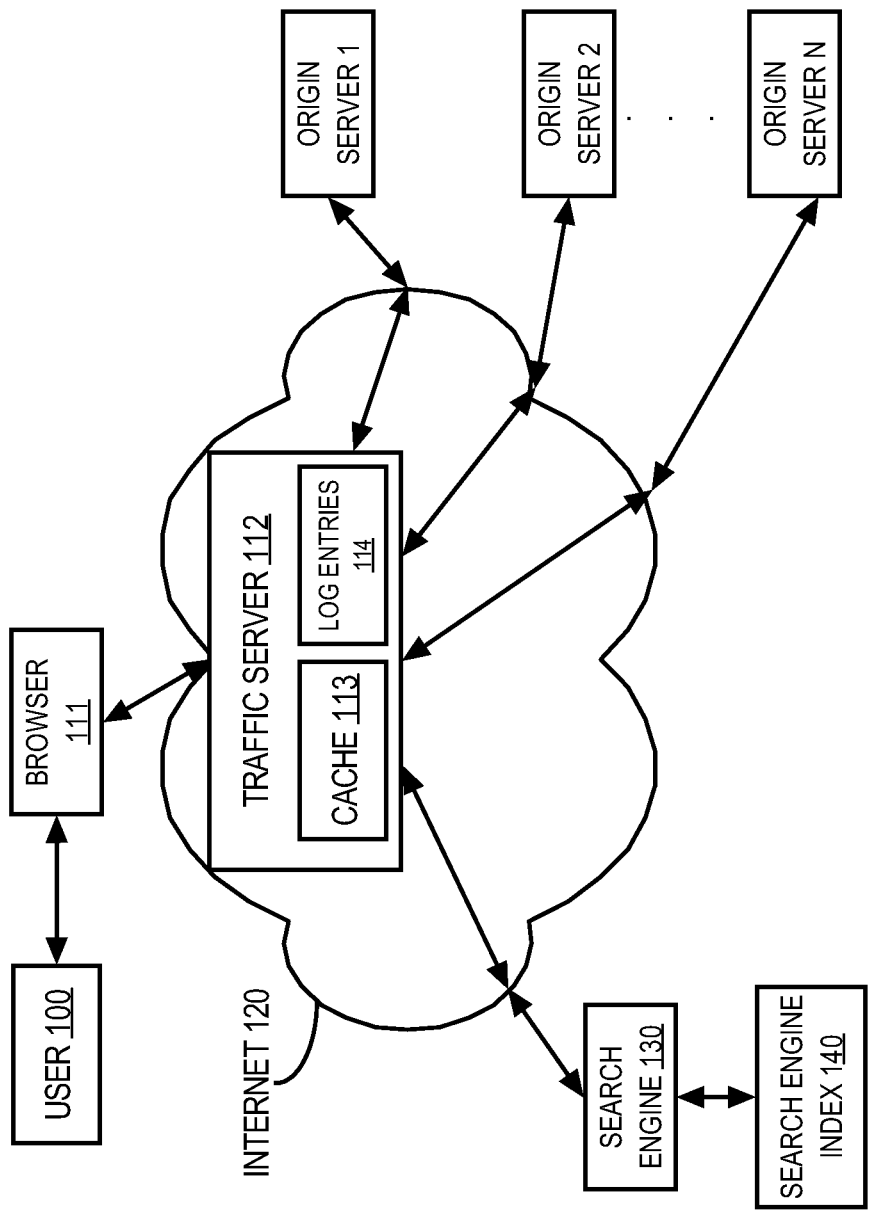
FIG. 1 is a block diagram that depicts a high level overview of a system that collects and uses network traffic logs for search enhancement, according to an embodiment of the invention.

FIG. 1 is a block diagram of a system that collects and uses network traffic logs for search enhancement. A user 100 requests to see the CNN.com web page by specifying a URL. The user's request goes to the browser 111 on the user's computer. The request is transmitted to the traffic server 112 over the Internet 120. Typically, user 100 would be just one of hundreds or thousands of users that access the Internet 120 through traffic server 112. According to one embodiment, the traffic server 112 is located at an internet service provider (ISP). According to one embodiment there are multiple traffic servers.

Since traffic server 112 is aware of all requests from users 100 that access the Internet 120 through traffic server 112, traffic server 112 generates logs entries 114 that reflect actual network usage. These log entries 114 among other things indicate the frequency web pages are referenced and modified. These log entries 114 or information from these log entries 114 are then used to improve document ranking, to improve web crawling, determine what tier of a multi-tiered index to insert a document, to determine link weights, and to update a search engine index. According to one embodiment log entries 114 are not collected for all types of requested items. For example, a configuration file can contain a list of document types that log entries 114 are collected for.

Some traffic servers include caches. For example, traffic server 112 is illustrated with a cache 113. If a current version of a web page resides in the cache 113 of traffic server 112, then traffic server 112 may provide the cached version of the web page to a user 100, rather than send the request to the origin server for the web page. Using caches in this manner increases the performance of the Internet from the perspective of user 100, and generally decreases the amount of traffic on the Internet.

For example, upon receipt of a request for the CNN.com web page, the traffic server 112 may check to see if a current version of the CNN.com web page is in the cache 113. If a current version of the CNN.com web page is in the cache 113, then that current version is given to the browser 111 to be displayed to the user 100. If the CNN.com web page is either not on the cache 113 or is in the cache 113 but is stale, then the traffic server 112 retrieves the current version from the CNN.com web page on its origin server (e.g. origin server 1), puts the current version in the cache 113 and gives the current version to the browser 111.

As the traffic server 112 is processing the web pages, the traffic server 112 generates log entries 114 for web pages that are referenced and modified. Traffic Server 112 transmits these log entries 114 to search engine 130. Search engine 130 uses the log entries 114 among other things to improve ranking accuracy and to improve web crawling. According to one embodiment, log entries 114 from multiple traffic servers are merged before sending the log entries 114 to search engine 130.

A search engine index 140 is associated with search engine 130. Search engine index 140 indexes a large number of web pages. According to one embodiment, the search engine 130 and the search engine index 140 are on one machine. According to another embodiment, the search engine 130 and the search engine index 140 are spread across many machines.

Determining Whether a Web Page is Stale

There are two techniques for determining whether a web page is stale: (1) using the last modified date in the HTTP protocol in conjunction with other information, or (2) using the expiration date in the HTTP protocol. The last modified date is used in conjunction with other information to determine if the document is stale. For example, a newspaper was modified yesterday and the newspaper is known to be replaced everyday. Furthermore, cache 113 can ask origin server 1 (this assumes that the web page in question is maintained on origin server 1) if a document with a particular last modified date is the latest version. Origin server 1 either indicates that the document is up to date or provides the latest version. How modified web pages are used is further discussed in the section "Using Modified Web Page Logs to Update the Search Engine Index". The expiration date is compared with today's date to determine if the copy in the cache is stale.

Using Network Usage Logs for Improved Ranking Accuracy

Network usage logs indicate how a network is actually being used. Popular web pages will tend to be viewed more frequently than other web pages. Consequently, requests for a popular web page will show up in usage logs more frequently than requests for unpopular web pages. Thus, the frequency of actual requests for a web page, as indicated in network usage logs, may give a far more accurate measure of what web pages are truly popular. For example, usage logs may indicate the popularity of a web site is frequently accessed through a widely disseminated email, even though the incoming link count for the web page is low.

According to one embodiment, the frequency, within the usage logs maintained by external sources, of requests for a page is used as the sole factor in determining the popularity weight to assign to a web page. According to alternative embodiments, the frequency of requests is one factor that is combined with one or more other factors to determine the popularity weight to assign to a web page. According to one embodiment, the ranking determination of a web page is made based on a network traffic log according to the equation:

$$\text{new\_ranking\_score} = \text{old\_ranking\_score} + a * \log(b * \text{count} + 1)$$

where a and b are adjustable parameters and count is the number of times the URL of the web page appeared in the network traffic log over some period of time. The factors used to determine old_ranking_score may include the various popularity tests employed by conventional ranking techniques, including the number of incoming links.

Typical values for b are 1 to 300. Assuming that the old_ranking_score has a maximum value of 1, typical values for a are 0.05 to 0.2. The period of time used could be as short as a few days or as long as a few months.

According to another embodiment, instead of or in addition to using a fixed period of time where the count is accumulated, an ongoing process may be used where new page views are worth more than old page views. In other words, a web page that is frequently requested in recent logs is given more weight than a web page that was requested with the same frequency in older logs.

Improved Web Crawling

As mentioned above, search engines typically find the items that they index by "crawling" the web by following links from site to site. Unfortunately, this process could miss popular sites that have few incoming links. Even if the sites are not missed, once they are encountered, they may simply be added to the end of a queue of millions or billions of URLs to be processed by the indexing mechanism. This may delay the indexing of the web pages for a period of time that is unacceptably long for truly popular web sites.

Therefore, one aspect of the invention involves using the usage log information to identify URLs (1) to add to the queue of the spider and/or index mechanism, and/or (2) to promote in the queue for faster processing. For example, the queue of URLs to be processed by an indexing mechanism may not include a URL that shows up a certain threshold number of times in usage logs In response to the number of appearances exceeding the threshold, the URL is added to the queue of the indexing mechanism.

As another example, a URL that is already in the queue of the indexing mechanism may show up very frequently in the usage logs. In response to the frequency exceeding a particular threshold, the position of the URL within the queue may be changed to put the URL closer to the head of the queue for faster processing.

Multi-Tiered Indexes

Some search engines include multiple tiers of indexes. The first-tier index is relatively small, and includes what the search engine has determined to be the most popular documents. Each subsequent tier of the index includes relatively more documents that are determined to be relatively less popular. Typically, a search query is run against the first tier index. Only if search results from the first tier index have been exhausted does the search engine run the query against a subsequent tier of the index.

According to one aspect of the invention, a search engine uses the usage logs to determine which tier of a multi-tier index should hold a particular document. Specifically, a document that is currently indexed in the second-tier index may be promoted to the first-tier index if the URL of the document appears with a relatively high frequency in the usage log. As with ranking, the frequency of a URL in a usage log may be just one of many factors used to determine the tier of the index to assign to the document associated with the URL.

Using Usage Logs for Link Weights

Search engines use information about the links to and from a document for a variety of purposes. As mentioned above, one use of link information is to determine the popularity of a document, where documents that have more incoming links are considered more popular than documents that have fewer incoming links.

As another example, indexes typically assign a weight to the relationship between words and documents. If a document has a strong logical tie to a word, then the relationship between the word and the document is given a relatively higher weight (hereinafter referred to as a "correlation weight"). For example, the relationship between the word "zebra" and an article about zebras would be given a high correlation weight, while the link between the word "zebra" and an article about automobiles would be given a low correlation weight. Links frequently have text associated with them. The text associated with a link typically has a logical relationship with the content of the document to which the link points. Some indexes take this relationship into account by increasing the correlation weight given to the relationship between a word and a document if the word appears in a link to the document.

According to one aspect of the invention, links are assigned weights (hereinafter referred to as "link weights") based on the content of usage logs. Specifically, certain usage logs may have enough information to determine not only which web pages were requested, but also which links were selected to request the pages. Thus, those links that are frequently selected may be given a higher link weight than those links that are less frequently selected even when the links are to the same document.

By assigning link weights in this manner, the search engine may be made more efficient at each place in which link information is used. For example, when link information is used to determine the popularity of the document, conventional techniques may assign the same popularity value to two documents with the same number of incoming links. However, using weighted links, a document that is pointed to by links that are frequently followed may be assigned a higher popularity value than a document with more incoming links that are rarely followed.

As another example, the link weights may be used to increase the accuracy of the indexing mechanism. Specifically, rather than simply assign the relationship between a word and a document a higher correlation weight because the word is in a link to the document, the correlation weight between the word and the document may be determined by both (1) the existence of the word in the link, and (2) the link weight associated with that link. For example, assume that a link to a document has the word "zebra", and another link to the same document has the word "engine". If the "zebra" link is rarely followed, then the fact that "zebra" is in a link to the document should not significantly increase the correlation weight between the word and the document. On the other hand, if the "engine" link is frequently followed, the fact that the word "engine" is in a frequently followed link to the document may be used to significantly increase the correlation weight between the word "engine" and the document.

Using Modified Web Page Logs to Update the Search Engine Index

Logs that identify web pages that have been modified (hereinafter referred to as "modified web page logs") since a search engine index was last updated can be used to update the search engine index. The last modified date is used to identify modified web pages as described in section "Determining Whether a Web Page is Stale". When a user requests a web page that has been modified within a specified length of time, the traffic server 112 creates a modified web page log that identifies the modified web page. Periodically, the modified web page logs are transmitted to a search engine. A "spider" that crawls the Internet is associated with the search engine. By using the modified web page logs the search engine spider's job is simplified. The spider does not need to only rely on locating web items by "crawling" the Internet. The "spider" uses the modified web page logs to determine what web pages to crawl and how frequently to crawl those web pages. For example, the "spider" crawls the web pages identified in the modified web page logs. Furthermore, the web pages that appear more frequently in the modified web page logs are crawled more frequently.

Hardware Overview

The approach for using network traffic logs for search enhancement described herein may be implemented in a variety of ways and the invention is not limited to any particular implementation. The approach may be integrated into a computer or a micro-coded device, or may be implemented as a stand-alone mechanism. Furthermore, the approach may be implemented in computer software, hardware, or a combination thereof.

Figure 2:
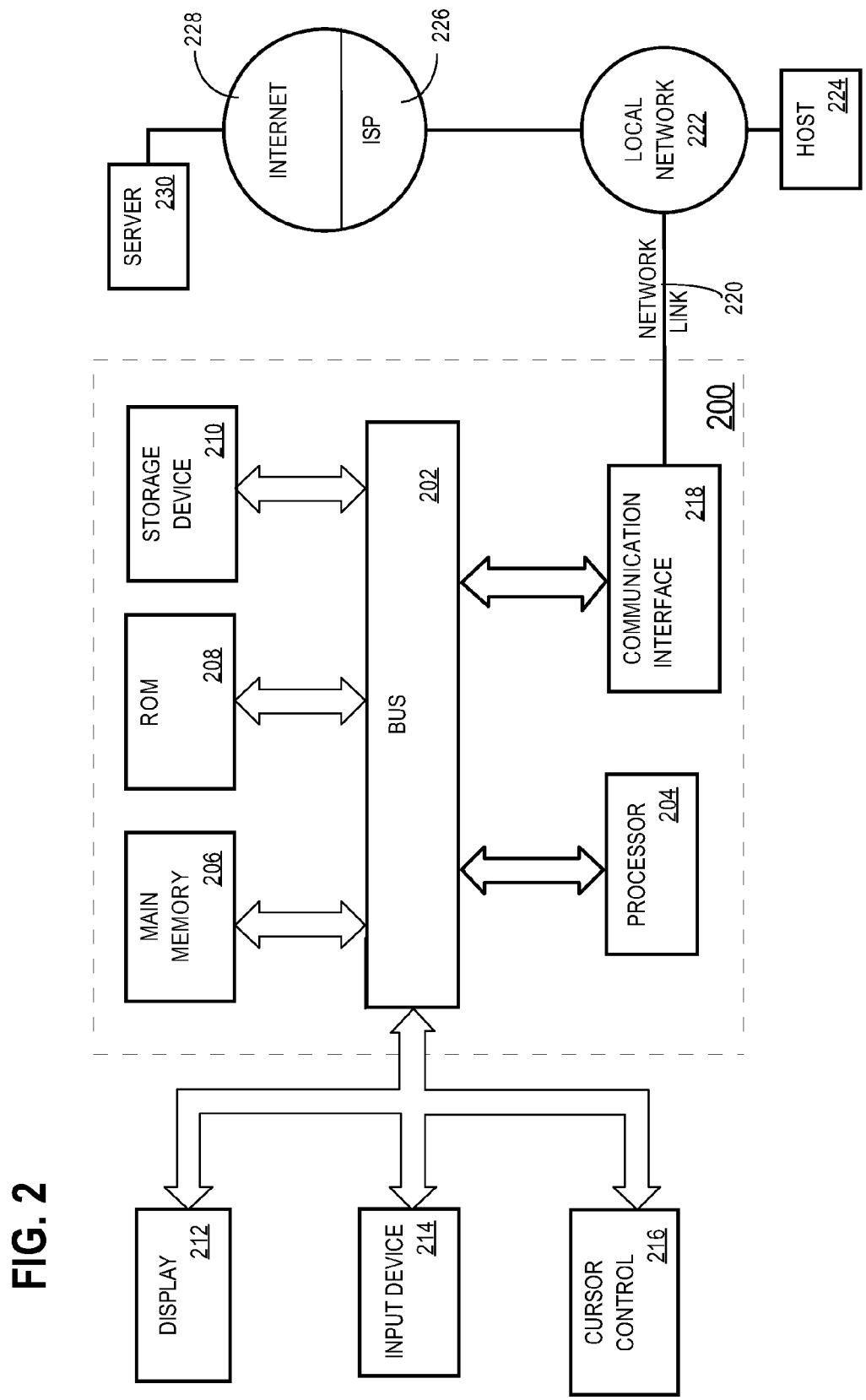
FIG. 2 is a block diagram that depicts a computer system upon which embodiments of the invention may be implemented.

FIG. 2 is a block diagram that depicts a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   determining whether an information source requested by a user has been modified within a specified length of time based on a Last-Modified field of a Hypertext Transfer Protocol (HTTP) header of a message associated with the information source;
   in response to determining that the information source has been modified within the specified length of time, creating an entry in a modified information source log that identifies the information source;
   retrieving information from the information source based on the modified information source log; and
   updating a search engine index based on the information;
   wherein the method is performed by one or more computing devices.

2. The method of claim 1, wherein the information source is a web page.

3. The method of claim 1, further comprising:
   increasing a frequency with which the information source is crawled to update the search engine index based on the modified information source log.

4. A non-transitory computer-readable storage medium storing one or more sequences of instructions that when executed by one or more processors causes the one or more processors to perform the steps of:
   determining whether an information source requested by a user has been modified within a specified length of time based on a Last-Modified field of a Hypertext Transfer Protocol (HTTP) header of a message associated with the information source;
   in response to determining that the information source has been modified within the specified length of time, creating an entry in a modified information source log that identifies the information source;
   retrieving information from the information source based on the modified information source log; and
   updating a search engine index based on the information.

5. The non-transitory computer-readable storage medium of claim 4, wherein the information source is a web page.

6. The non-transitory computer-readable storage medium of claim 4, further comprising instructions for:
   increasing a frequency with which the information source is crawled to update the search engine index based on the modified information source log.

7. The method of claim 1, further comprising sending the modified information source log to a search engine that maintains the search engine index.

8. The method of claim 7, wherein the sending is performed periodically.

9. The method of claim 1, further comprising:
   forwarding the request to a content server hosting the information source;
   receiving a response from the content server that specifies when the information source was last modified.

10. The method of claim 1, wherein the steps of determining whether the information source requested by the user has been modified in the specified period of time and creating the entry in the modified information source log is performed by a traffic server.

11. The non-transitory computer-readable medium of claim 4, further comprising instructions for sending the modified information source log to a search engine that maintains the search engine index.

12. The non-transitory computer-readable medium of claim 11, wherein the sending is performed periodically.

13. The non-transitory computer-readable medium of claim 4, further comprising instructions for:
   forwarding the request to a content server hosting the information source;
   receiving a response from the content server that specifies when the information source was last modified.

14. The non-transitory computer-readable medium of claim 4, wherein determining whether the information source requested by the user has been modified in the specified period of time and creating the entry in the modified information source log is performed by a traffic server.

* * * * *